(12) United States Patent
Xiong et al.

(10) Patent No.: US 11,125,276 B2
(45) Date of Patent: Sep. 21, 2021

(54) OUTPUT SHAFT COMPONENT WITH ELASTIC BODY

(71) Applicant: UBTECH Robotics Corp, Shenzhen (CN)

(72) Inventors: Youjun Xiong, Shenzhen (CN); Kunlei Zhao, Shenzhen (CN); Wenhua Yu, Shenzhen (CN); Zheng Xie, Shenzhen (CN); Zhaohui An, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 390 days.

(21) Appl. No.: 16/234,631

(22) Filed: Dec. 28, 2018

(65) Prior Publication Data

US 2020/0132125 A1    Apr. 30, 2020

(30) Foreign Application Priority Data

Oct. 31, 2018 (CN) .......................... 201811291328.8

(51) Int. Cl.
*F16D 3/12* (2006.01)
*F16D 1/10* (2006.01)

(52) U.S. Cl.
CPC ................. *F16D 3/12* (2013.01); *F16D 1/10* (2013.01); *F16D 2001/103* (2013.01); *Y10S 901/28* (2013.01)

(58) Field of Classification Search
CPC ........ F16D 3/12; F16D 1/10; F16D 2001/103; F16D 3/76; F16D 2300/18; Y10S 901/28; F16F 15/08; B25J 9/102; B25J 17/0208; B25J 9/108; B25J 17/0241

USPC .............................................. 464/23, 89, 90
See application file for complete search history.

(56) References Cited

U.S. PATENT DOCUMENTS

| | | | | |
|---|---|---|---|---|
| 1,775,556 A * | 9/1930 | Hewel | ....................... | F16D 3/76 464/91 |
| 1,802,148 A * | 4/1931 | Hatfield | ..................... | F16D 3/76 464/89 |
| 4,728,314 A * | 3/1988 | Eckel | ........................ | F16D 3/80 464/90 |
| 7,654,906 B2 * | 2/2010 | Okinaga | ................ | F16F 15/126 464/23 |
| 8,595,934 B2 * | 12/2013 | Derse | ..................... | F16H 55/14 464/89 |
| 10,500,734 B1 * | 12/2019 | Xiong | ...................... | B25J 9/126 |

(Continued)

FOREIGN PATENT DOCUMENTS

| CN | 105082170 A | 11/2015 |
|---|---|---|
| CN | 106931060 A | 7/2017 |
| CN | 107309865 A | 11/2017 |

(Continued)

*Primary Examiner* — Greg Binda

(57) ABSTRACT

The present disclosure provides an output shaft component and a power output mechanism. The output shaft component includes a housing connected to the driven member, an adapter shaft connected to an output shaft of the power output mechanism, and an elastic body mounted in the housing. The adapter shaft is rotatably mounted in the housing. The elastic body includes an inner ring, an outer ring located outside the inner ring, and an elastic portion connected between the inner ring and the outer ring. The adapter shaft is sheathed in the inner ring, the inner ring is synchronously rotatably connected to the adapter shaft, and the outer ring is fixed on the housing.

14 Claims, 4 Drawing Sheets

(56) References Cited

U.S. PATENT DOCUMENTS

2019/0152053 A1*  5/2019  Xiong ..................... B25J 9/126

FOREIGN PATENT DOCUMENTS

| DE | 682 308 | * | 10/1939 | ..................... 464/90 |
| FR | 2 685 415 A | * | 6/1993 | ..................... 464/89 |
| FR | 2 685 415 A1 | * | 6/1993 | ..................... 464/89 |
| GB | 459029 | * | 12/1936 | ..................... 464/89 |

* cited by examiner

OUTPUT SHAFT COMPONENT WITH ELASTIC BODY

CROSS REFERENCE TO RELATED APPLICATIONS

This application claims priority to Chinese Patent Application No. 201811291328.8, filed Oct. 31, 2018, which is hereby incorporated by reference herein as if set forth in its entirety.

BACKGROUND

1. Technical Field

The present invention belongs to the technical field of output shaft structures, and more specifically, relates to an output shaft component and a robot.

2. Description of Related Art

A power output mechanism and a driven member of an existing robot are both rigidly connected, that is, the power output mechanism and the driven member (for example, a skeleton of the robot) are directly connected. When an external force is applied to a robot that uses this connection manner, an internal servo used as a power output is susceptible to damage. Especially, for example, a large humanoid robot falls accidentally. Because the robot has a relatively heavy weight, when the gravitational force is applied on arms and legs of the robot, the servos at joints are damaged very easily. The servos accounts for a large part of costs of the entire robot. If the servos are frequently damaged, reliability of the robot is reduced, and maintenance costs are increased for users.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

To make the technical problems to be resolved, technical solutions, and beneficial effects of the present invention more comprehensible, the present invention is further described in detail below with reference to the accompanying drawings and embodiments. It should be understood that specific embodiments described herein are merely used to explain the present invention instead of limiting the present invention.

It should be noted that when an element is referred to as being "fixed to" or "disposed on" another element, it can be directly or indirectly located on the another element. When an element is referred to as being "connected to" another element, it can be directly or indirectly connected to the another element.

It should be understood that orientation or location relationships indicated by terms "length", "width", "up", "down" "front" "rear" "left", "right", "vertical", "horizontal", "top", "bottom", "inside", and "outside" are based on orientation or location relationships shown in the accompanying drawings and are only used to facilitate description of the present invention and simplify description but are not used to indicate or imply that the apparatuses or elements must have specific orientations or are constructed and operated by using specific orientations and therefore cannot be understood as a limit to the present invention.

In addition, the terms such as "first" and "second" are used only for the purpose of description, and should not be understood as indicating or implying the relative importance or implicitly specifying the number of the indicated technical features. Therefore, when features are defined by "first" and "second", one or more such features can be explicitly or implicitly included. In the description of the present invention, unless otherwise particularly defined, "a plurality of" means two or more than two.

Figure 1:
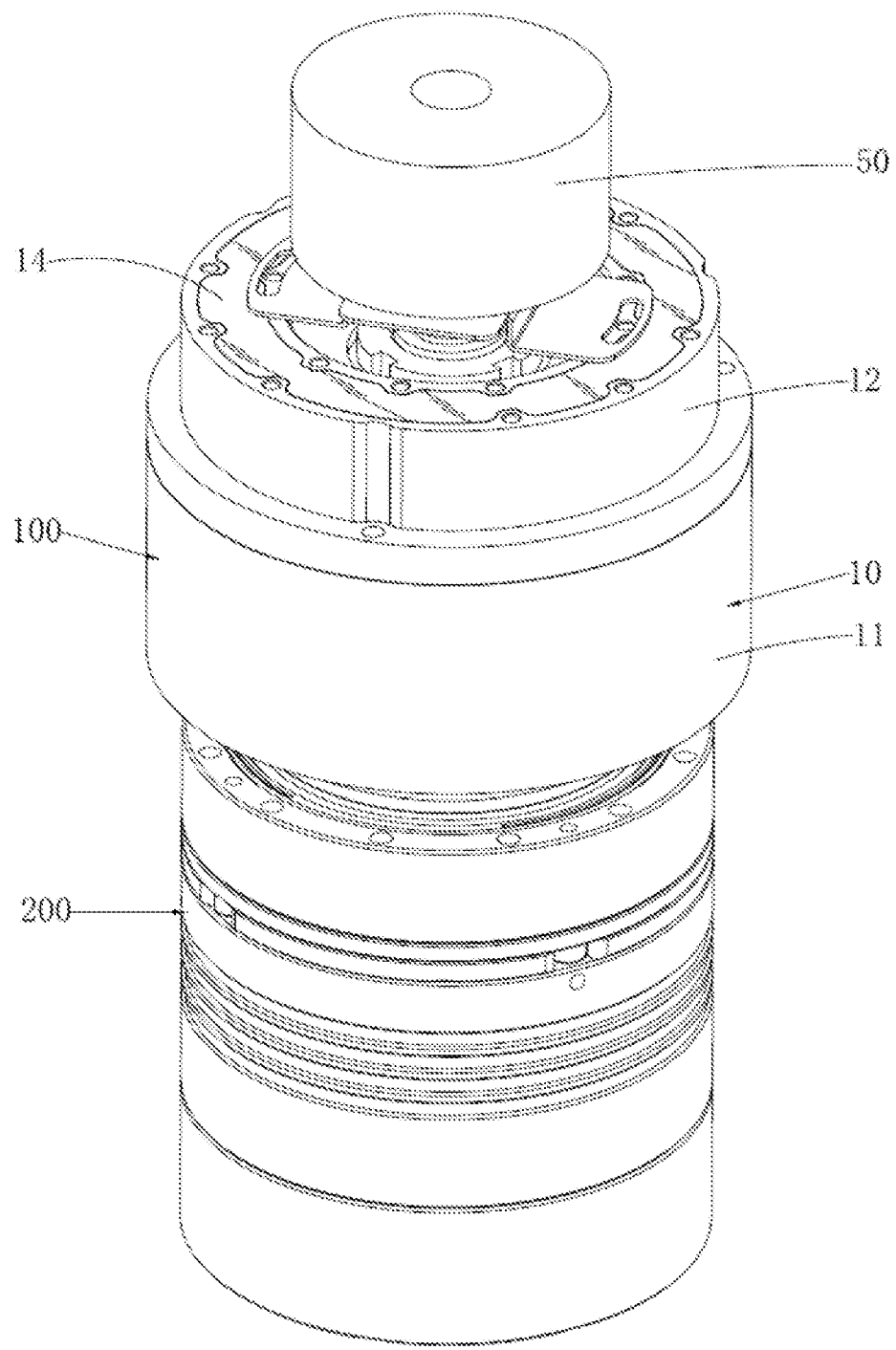
FIG. 1 is a three-dimensional assembly diagram of an output shaft component according to an embodiment of the present invention.
Figure 2:
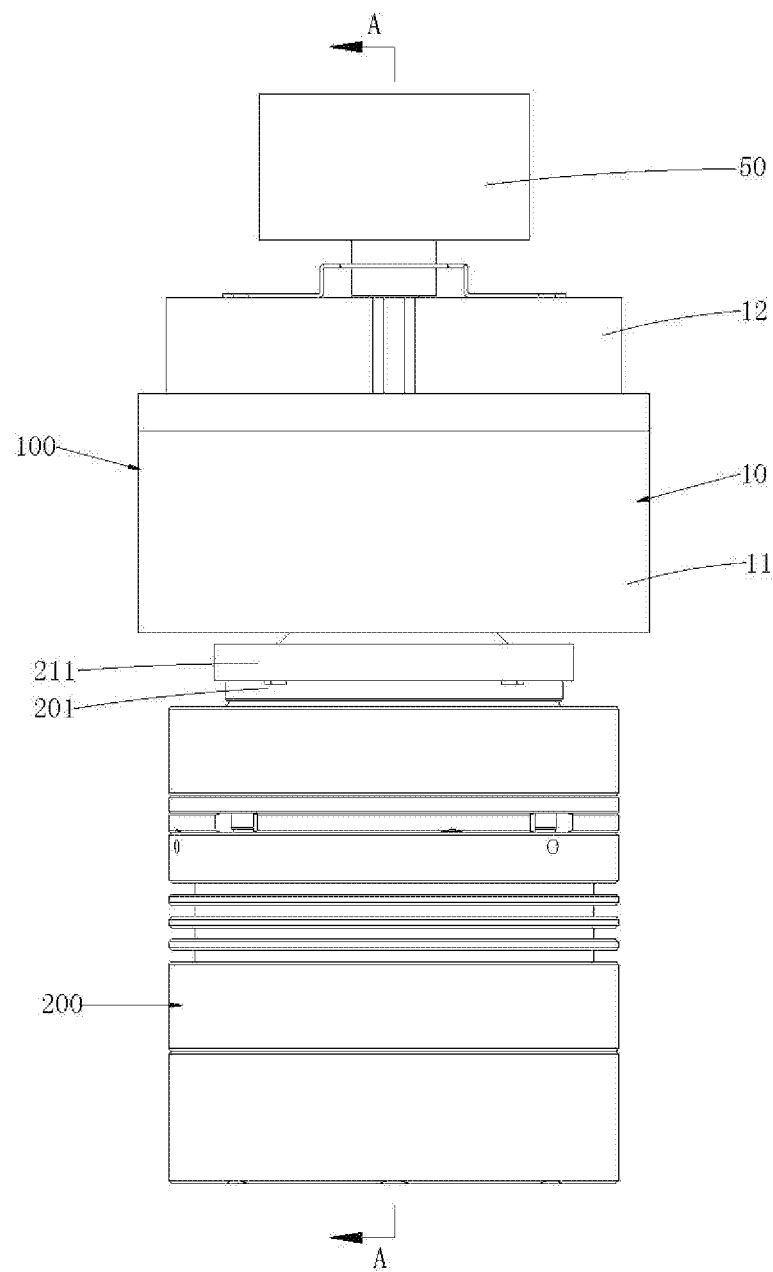
FIG. 2 is a front view of the output shaft component in FIG. 1.
Figure 3:
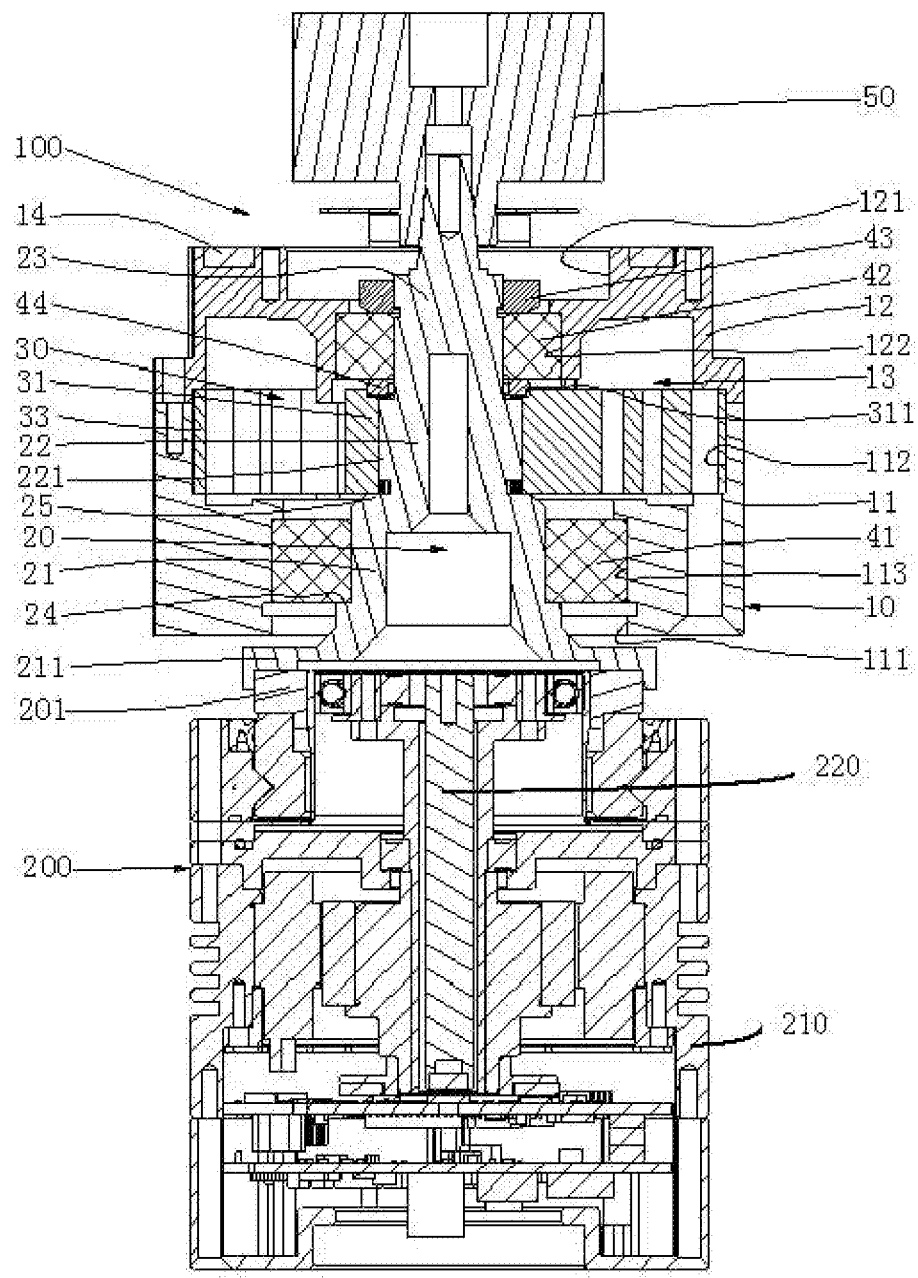
FIG. 3 is a sectional view of the output shaft component in FIG. 2 along a line A-A.
Figure 4:
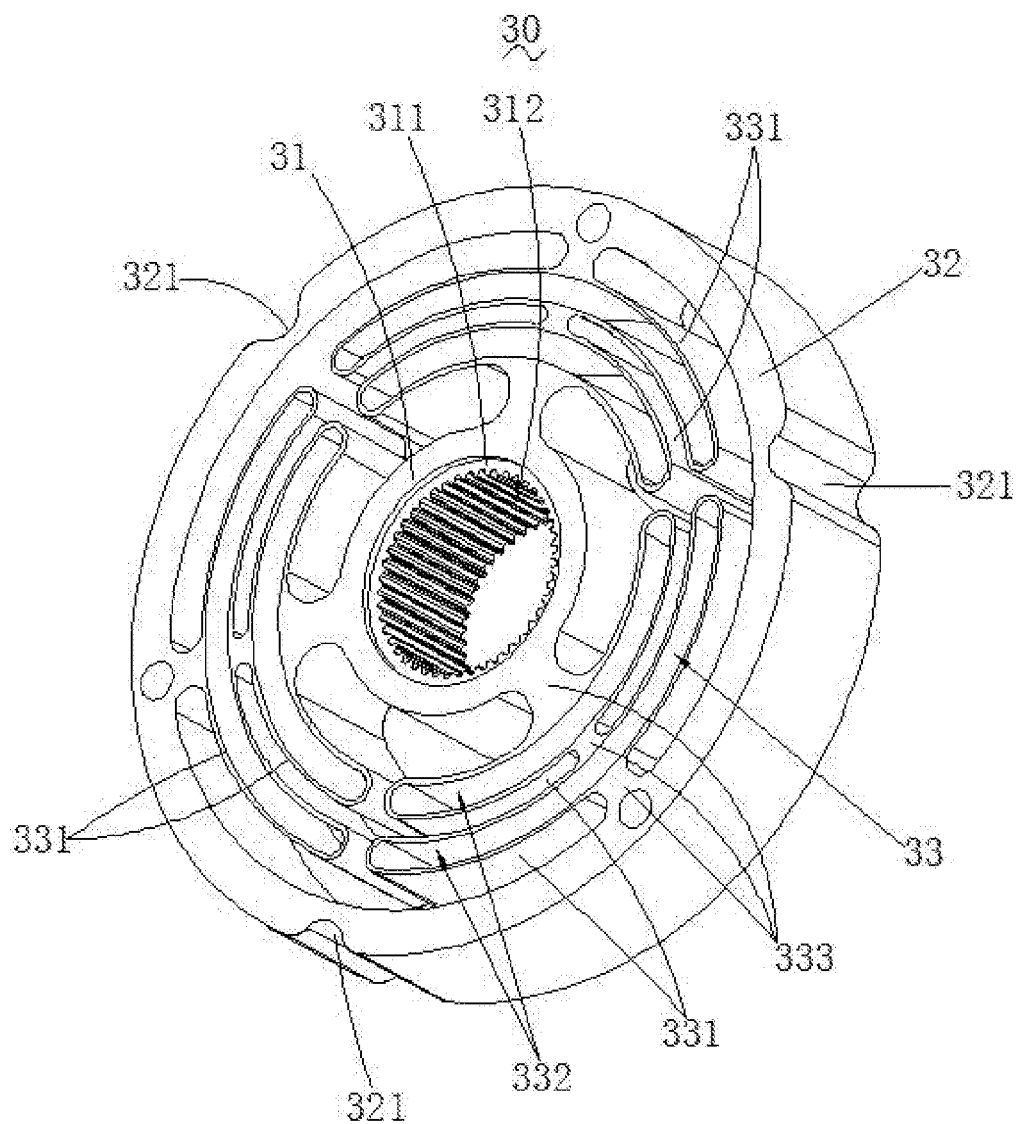
FIG. 4 is a three-dimensional structural diagram of an elastic body applied in the output shaft component in FIG. 1.

Referring to FIG. 1 to FIG. 4 together, an output shaft component 100 provided in the present invention is described first. The output shaft component 100 includes a housing 10, an adapter shaft 20, and an elastic body 30. The housing 10 is configured to connect to a driven member (not shown). The adapter shaft 20 is configured to connect to a power output mechanism 200, and the adapter shaft 20 is rotatably mounted in the housing 10. The elastic body 30 is mounted in the housing 10. The elastic body 30 includes an inner ring 31, an outer ring 32 located outside the inner ring 31, and an elastic portion 33 connected between the inner ring 31 and the outer ring 32. The adapter shaft 20 is sheathed in the inner ring 31. The inner ring 31 is synchronously rotatably connected to the adapter shaft 20. The outer ring 32 is fixed on the housing 10.

The adapter shaft 20 is rotatably mounted in the housing 10. The adapter shaft 20 is sheathed in the inner ring 31 of the elastic body 30 and is synchronously rotatably connected to the inner ring 31. The outer ring 32 of the elastic body 30 is fixed on the housing 10. The adapter shaft 20 is connected to the power output mechanism 200, and the housing 10 is connected to the driven member. The output shaft component 100 is convenient to mount and is simple and practical. During working, the power output mechanism 200 drives the adapter shaft 20 to rotate, the elastic body 30 rotates along with the adapter shaft 20, and the elastic body 30 drives the housing 10 to rotate, so as to make the driven member perform an action. If an external force is applied to the driven member, because the elastic portion 33 is connected between the inner ring 31 and the outer ring 32 of the elastic body 30, an elastic deformation occurs in the elastic portion 33, and an angle difference exists between the outer ring 32 and the inner ring 31, so that the output shaft component 100 has a particular cushioning effect, damage caused by the external force to the power output mechanism 200 can be effectively reduced, the power output mechanism 200 is effectively protected, reliability is improved, and maintenance costs are reduced for users.

The power output mechanism 200 includes a case 210 and an output shaft 220 received in the case 210. In assembly, one end of the adapter shaft 20 is connected to the output shaft 220 of the power output mechanism 200 and fixed with the output shaft 220 of the power output mechanism 200. The adapter shaft 20 is sheathed in the inner ring 31 of the elastic body 30 and is synchronously rotatably connected to the inner ring 31. The outer ring 32 of the elastic body 30 is fixed on the housing 10 of the output shaft component 100.

In an exemplary embodiment, the driven member may be a limb of a robot. The power output mechanism 200 may be a servo of the robot to drive the limb to rotate. In use, when the servo is used as a joint between a first component and a second component of the robot, the first component can be fixed to the housing 10 of the output shaft component 100, and the second component can be fixed to an outer surface of the case 210 of the servo 200. The first component can then rotate, as driven by the output shaft component 100, with respect to the second component.

That is, an end of the adapter shaft 20 is fixedly connected to the output shaft of the power output mechanism 200, and the housing 10 is fixedly connected to the driven member, to drive the robot to perform an action. The adapter shaft 20 is sheathed in the housing 10. The elastic body 30 is disposed between the housing 10 and the adapter shaft 20. The structure is easy to assemble and is compact, and the elastic body 30 can be easily installed by few components.

Further, in a specific implementation of the output shaft component 100 provided in the present invention, the housing 10 includes a bottom housing 11 and a surface housing 12 fixed on the bottom housing 11. The bottom housing 11 has a first via 111. The surface housing 12 has a second via 121 provided opposite the first via 111. The adapter shaft 20 is sheathed in the first via 111 and the second via 121. The bottom housing 11 and the surface housing 12 enclose to form an accommodating cavity 13. The elastic body 30 is located in the accommodating cavity 13. The structure is easily assembled, and the elastic body 30 can be installed by few components. The housing 10 can protect and fix the elastic body 30, and the overall structure is compact. The adapter shaft 20 is sheathed in the first via 111 and the second via 121, and the adapter shaft 20 is supported in the housing 10 and is rotatably mounted in the housing 10. The power output mechanism 200 is connected to an end portion, extending from the bottom housing 11, of the adapter shaft 20. The driven member is connected to the surface housing 12, to drive a robot to perform an action, and the structure is compact. The driven member may be connected to the surface housing 12 through a fastening member, and is easy to assemble.

Further, in a specific implementation of the output shaft component 100 provided in the present invention, a mounting position 112 configured to mount the elastic body 30 is disposed in the bottom housing 11. The outer ring 32 is fixed on the bottom housing 11 by using a first fastening member (not shown). The surface housing 12 is fixed on the bottom housing 11 by using a second fastening member (not shown). The elastic body 30 is sandwiched between the surface housing 12 and the bottom housing 11 in an axial direction. The structure is easy to assemble, to enable the outer ring 32 to be fixed on the bottom housing 11 and the outer ring 32 of the elastic body 30 to be fixed on the housing 10. The elastic body 30 approximately has a cylindrical form. The shape of the mounting position 112 of the bottom housing 11 matches the shape of the elastic body 30, making it easy to assemble the elastic body 30 in the bottom housing 11. An inner diameter of the surface housing 12 is less than an outer diameter of the elastic body 30. When the surface housing 12 is locked with the bottom housing 11 through the second fastening member, a side of the surface housing 12 is held against the elastic body 30 to fix the position of the elastic body 30. The first fastening member and the second fastening member may be bolts and are easy to assemble.

Further, in a specific implementation of the output shaft component 100 provided in the present invention, a notch 321 for the second fastening member to pass through is provided on an outer side surface of the outer ring 32. The structure can reduce the volume of the output shaft component 100 and the structure is compact.

Further, in a specific implementation of the output shaft component 100 provided in the present invention, a first bearing 41 configured to support the adapter shaft 20 is disposed in the bottom housing 11, and a second bearing 42 configured to support the adapter shaft 20 is disposed in the surface housing 12. The structure is easy to assemble, so that a frictional force between the adapter shaft 20 and outside is reduced, the efficiency is improved, and wear is reduced. A first placement position 113 configured to place the first bearing 41 is disposed at the first via 111 of the bottom housing 11, and a second placement position 122 configured to place the second bearing 42 is disposed at the second via 121 of the surface housing 12. The structure facilitates assembly of the bearings.

The adapter shaft 20 has a first limiting step 24 configured to limit the first bearing 41 in an axial direction. The first limiting step 24 on the adapter shaft 20 is held against a side of the first bearing 41, thereby preventing the first bearing 41 from falling off.

The adapter shaft 20 has a second limiting step 25 configured to limit the inner ring 31 in an axial direction. A locking nut 43 is held against a side, away from the inner ring 31, of the second bearing 42. A thread of the locking nut 43 is connected to the adapter shaft 20. The second bearing 42 is limited in an axial direction by using the second limiting step 25, the inner ring 31, a gasket 44, and the locking nut 43. The structure is easy to assemble. The locking nut 43 is used to implement fitting and locking to the second bearing 42. Two sides of the inner ring 31 are respectively held against the second limiting step 25 and the gasket 44 to limit the inner ring 31 in the axial direction.

The gasket 44 is sandwiched between the second bearing 42 and the inner ring 31. The inner ring 31 has a third limiting step 311 configured to limit the gasket 44 in an axial direction. When the adapter shaft 20 and the inner ring 31 of the elastic body 30 rotate, there is rotation relative to the housing 10. Therefore, to prevent direct contact between the second bearing 42 and the inner ring 31 that causes component loss, the gasket 44 is disposed between the second bearing 42 and the inner ring 31.

The adapter shaft 20 includes a first section 21 configured to mount the first bearing 41, a second section 22 configured to mount the inner ring 31 of the elastic body 30, and a third section 23 configured to mount the second bearing 42. The first section 21, the second section 22, and the third section 23 are sequentially connected. A diameter of the first section 21 is greater than a diameter of the second section 22. The diameter of the second section 22 is greater than a diameter of the third section 23. The first limiting step 24 is located at a position, away from the second section 22, of the first section 21. The second limiting step 25 is located between the first section 21 and the second section 22. The adapter shaft 20 is easy to form to facilitate assembly of the first bearing 41, the elastic body 30, and the second bearing 42. The adapter shaft 20 further includes an adapter disk 211 connected to an end portion of the first section 21 and a steering disk 201 configured to connect to a power output of the servo.

Further, in a specific implementation of the output shaft component 100 provided in the present invention, the elastic portion 33 includes several radially distributed arc-shaped arms 331, two arc-shaped arms 331 distributed adjacently in a radial direction are connected through a connecting arm 333, the inner ring 31 and the arc-shaped arm 331 near the inner ring 31 are connected through a connecting arm 333, the outer ring 32 and the arc-shaped arm 331 near the outer ring 32 are connected through a connecting arm 333, and two adjacent arc-shaped arms 331 in a circumferential direction are spaced apart. The elastic portion 33 is connected between the inner ring 31 and the outer ring 32 of the elastic body 30, and an elastic deformation can occur in the structure in the circumferential direction. If an external force is applied to the driven member, an elastic deformation occurs in the elastic portion 33, and an angle difference exists between the outer ring 32 and the inner ring 31, so that the output shaft component 100 has a particular cushioning effect, damage caused by the external force to the power output mechanism 200 can be effectively reduced, the power output mechanism 200 is effectively protected, reliability is improved, and maintenance costs are reduced for users. Several layers of arc-shaped arms 331 are disposed. The arc-shaped arms 331 are arc-shaped and are uniformly arranged around the inner ring 31 with the inner ring 31 as the center of circle. Two adjacent layers of arc-shaped arms 331 are spaced apart, and an elastic deformation can occur in the structure in the circumferential direction. The elastic body 30 is formed integrally by using an elastic material, and is easy to manufacture. A through groove 332 extending in an axial direction is opened at the arc-shaped arms 331. The structure is easy to process, so that materials are saved, an elastic deformation capability of the elastic body 30 can further be improved, and a cushioning effect of the output shaft component 100 is improved to absorb the external force.

Further, in a specific implementation of the output shaft component 100 provided in the present invention, the inner ring 31 and the adapter shaft 20 are connected via splines. Internal splines 312 are disposed on the inner ring 31, and external splines 221 are disposed on the adapter shaft 20, so that the structure is easy to form and assemble, to enable the adapter shaft 20 to be synchronously rotatably connected to the inner ring 31.

Further, in a specific implementation of the output shaft component 100 provided in the present invention, an angle sensor 50 configured to detect a relative rotational angle between the adapter shaft 20 and the housing 10 is disposed on the housing 10. The angle sensor 50 is fixed at the top of the surface housing 12. An input shaft of the angle sensor 50 is fixedly connected to the adapter shaft 20, so that an output angle of the power output mechanism 200 and a relative rotational angle between the adapter shaft 20 and the housing 10 can be detected. Accurate output driving force can be implemented by using the output shaft component 100. The angle sensor 50 may be a magnetic encoder. In the embodiment, an value of the output driving force of the power output mechanism 200 may be calculated by a following formula:

$$F=kd\theta,$$

where F represents the output driving force, k represents a rigidity of the elastic body 30, and dθ represents the angle difference between the inner ring 31 of the elastic body 30 and the outer ring 32 of the elastic body 30, detected by the angle sensor 50.

If the external force is applied to the driven member, which preferably is the limb of the robot, because the elastic portion 33 is connected between the inner ring 31 and the outer ring 32 of the elastic body 30, an elastic deformation occurs in the elastic portion 33, and the angle difference exists between the outer ring 32 and the inner ring 31, such that robot adjusts the output driving force according to the detected angle difference automatically.

Further, in a specific implementation of the output shaft component 100 provided in the present invention, the housing 10 has a transparent observation portion 14. The transparent observation portion 14 is made of a transparent material, so that while the mechanism airtightness is ensured, it is convenient to observe a working state inside the elastic body 30 from outside. An acrylic plate is mounted at an end portion of the surface housing 12 to implement the transparent observation portion 14.

The present disclosure further discloses a robot including a driven member, a power output mechanism 200, and the foregoing output shaft component 100. The driven member is connected to a housing 10, and the power output mechanism 200 is connected to an adapter shaft 20.

The adapter shaft 20 is rotatably mounted in the housing 10. The adapter shaft 20 is sheathed in an inner ring 31 of an elastic body 30 and is synchronously rotatably connected to the inner ring 31. An outer ring 32 of the elastic body 30 is fixed on the housing 10. The adapter shaft 20 is connected to the power output mechanism 200, and the housing 10 is connected to the driven member. The output shaft component 100 is convenient to mount and is simple and practical. During working, the power output mechanism 200 drives the adapter shaft 20 to rotate, the elastic body 30 rotates along with the adapter shaft 20, and the elastic body 30 drives the housing 10 to rotate, so as to make the driven member perform an action. If an external force is applied to the driven member, because an elastic portion 33 is connected between the inner ring 31 and the outer ring 32 of the elastic body 30, an elastic deformation occurs in the elastic portion 33, and an angle difference exists between the outer ring 32 and the inner ring 31, so that the output shaft component 100 has a particular cushioning effect, damage caused by the external force to the power output mechanism 200 can be effectively reduced, the power output mechanism 200 is effectively protected, reliability is improved, and maintenance costs are reduced for users.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:
1. An output shaft component, comprising:
    a housing, configured to connect to a driven member;
    an adapter shaft, configured to connect to a power output mechanism, wherein the adapter shaft is rotatably mounted in the housing; and
    an elastic body, mounted in the housing, and comprising an inner ring, an outer ring located outside the inner ring, and an elastic portion connected between the inner ring and the outer ring, wherein the adapter shaft is sheathed in the inner ring, the inner ring is synchronously rotatably connected to the adapter shaft, and the outer ring is fixed on the housing;
    wherein the housing comprises a bottom housing and a surface housing fixed on the bottom housing, the bottom housing and the surface housing enclose to form an accommodating cavity, and the elastic body is located in the accommodating cavity;

wherein the outer ring is fixed on the bottom housing, and a notch is defined on an outer side surface of the outer ring;

wherein the bottom housing defines a first via, the surface housing defines a second via opposite the first via, the adapter shaft is sheathed in the first via and the second via;

wherein a first bearing is disposed in the bottom housing and configured to support the adapter shaft, and a second bearing is disposed in the surface housing and configured to support the adapter shaft;

the adapter shaft comprises a first limiting step configured to limit the first bearing in an axial direction; and the adapter shaft comprises a second limiting step configured to limit the inner ring in an axial direction, a locking nut is held against a side, away from the inner ring, of the second bearing, and a thread of the locking nut is connected to the adapter shaft.

2. The output shaft component according to claim 1, wherein a mounting position is disposed in the bottom housing and configured to mount the elastic body, and the elastic body is sandwiched between the surface housing and the bottom housing in an axial direction.

3. The output shaft component according to claim 1, wherein a gasket is sandwiched between the second bearing and the inner ring, and the inner ring comprises a third limiting step configured to limit the gasket in an axial direction.

4. The output shaft component according to claim 1, wherein the elastic portion comprises a plurality of radially distributed arc-shaped arms, two arc-shaped arms distributed adjacently in a radial direction are connected through a connecting arm, the inner ring and the arc-shaped arm near the inner ring are connected through a connecting arm, the outer ring and the arc-shaped arm near the outer ring are connected through a connecting arm, and two adjacent arc-shaped arms in a circumferential direction are spaced apart.

5. The output shaft component according to claim 1, wherein the inner ring and the adapter shaft are connected via splines.

6. The output shaft component according to claim 1, further comprising an angle sensor disposed on the housing, and configured to detect a relative rotational angle between the adapter shaft and the housing.

7. The output shaft component according to claim 1, wherein the housing has a transparent observation portion.

8. A power output mechanism, comprising:
a case;
an output shaft received in the case; and
an output shaft component comprising:
a housing, configured to connect to a driven member;
an adapter shaft, configured to connect to the output shaft and fixed with the output shaft, wherein the adapter shaft is rotatably mounted in the housing; and
an elastic body, mounted in the housing, and comprising an inner ring, an outer ring located outside the inner ring, and an elastic portion connected between the inner ring and the outer ring, wherein the adapter shaft is sheathed in the inner ring, the inner ring is synchronously rotatably connected to the adapter shaft, and the outer ring is fixed on the housing;

wherein the housing comprises a bottom housing and a surface housing fixed on the bottom housing, the bottom housing and the surface housing enclose to form an accommodating cavity, and the elastic body is located in the accommodating cavity;

wherein the outer ring is fixed on the bottom housing, and a notch is defined on an outer side surface of the outer ring;

wherein the bottom housing defines a first via the surface housing defines a second via opposite the first via, the adapter shaft is sheathed in the first via and the second via;

wherein a first bearing is disposed in the bottom housing and configured to support the adapter shaft, and a second bearing is disposed in the surface housing and configured to support the adapter shaft;

the adapter shaft comprises a first limiting step configured to limit the first bearing in an axial direction; and the adapter shaft comprises a second limiting step configured to limit the inner ring in an axial direction, a locking nut is held against a side, away from the inner ring, of the second bearing, and a thread of the locking nut is connected to the adapter shaft.

9. The power output mechanism according to claim 8, wherein a mounting position is disposed in the bottom housing and configured to mount the elastic body, and the elastic body is sandwiched between the surface housing and the bottom housing in an axial direction.

10. The power output mechanism according to claim 8, wherein a gasket is sandwiched between the second bearing and the inner ring, and the inner ring comprises a third limiting step configured to limit the gasket in an axial direction.

11. The power output mechanism according to claim 8, wherein the elastic portion comprises a plurality of radially distributed arc-shaped arms, two arc-shaped arms distributed adjacently in a radial direction are connected through a connecting arm, the inner ring and the arc-shaped arm near the inner ring are connected through a connecting arm, the outer ring and the arc-shaped arm near the outer ring are connected through a connecting arm, and two adjacent arc-shaped arms in a circumferential direction are spaced apart.

12. The power output mechanism according to claim 8, wherein the inner ring and the adapter shaft are connected via splines.

13. The power output mechanism according to claim 8, further comprising an angle sensor disposed on the housing, and configured to detect a relative rotational angle between the adapter shaft and the housing.

14. The power output mechanism according to claim 8, wherein the housing has a transparent observation portion.

* * * * *